(12) United States Patent
Suzuki (10) Patent No.: US 7,792,358 B2
(45) Date of Patent: Sep. 7, 2010

(54) IMAGING DEVICE PERFORMING COLOR IMAGE DATA PROCESSING

(75) Inventor: Masahiro Suzuki, Inzai (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 12/285,984

(22) Filed: Oct. 17, 2008

(65) Prior Publication Data

US 2009/0122166 A1    May 14, 2009

Related U.S. Application Data

(63) Continuation of application No. 10/856,842, filed on Jun. 1, 2004, now abandoned.

(30) Foreign Application Priority Data

Jun. 4, 2003    (JP) .............................. 2003-159459

(51) Int. Cl.
*G06K 9/00* (2006.01)
*H04N 9/64* (2006.01)

(52) U.S. Cl. ...................................... 382/167; 348/246
(58) Field of Classification Search .................. 382/167
See application file for complete search history.

(56) References Cited

U.S. PATENT DOCUMENTS

| 4,652,928 | A | 3/1987 | Endo et al. |
|---|---|---|---|
| 4,701,784 | A | 10/1987 | Matsuoka et al. |
| 4,945,406 | A | 7/1990 | Cok |
| 5,361,147 | A | 11/1994 | Katayama et al. |
| 5,754,678 | A | 5/1998 | Hawthorne et al. |
| 5,909,505 | A | 6/1999 | Katayama et al. |
| 6,788,340 | B1 | 9/2004 | Chen et al. |
| 2002/0012053 | A1 | 1/2002 | Yoshida |
| 2002/0015111 | A1 | 2/2002 | Harada |
| 2002/0039143 | A1 | 4/2002 | Sasaki |
| 2002/0158977 | A1 | 10/2002 | Hamilton, Jr. |
| 2002/0163674 | A1* | 11/2002 | Hamilton, Jr. ............... 358/461 |
| 2003/0025813 | A1 | 2/2003 | Yoshiwara et al. |

(Continued)

FOREIGN PATENT DOCUMENTS

JP    A-56-147578    11/1981

(Continued)

OTHER PUBLICATIONS

Takagi, "Image Analysis Handbook," University of Tokyo Press, pp. 539-548, Jan. 17, 1991.

*Primary Examiner*—Bhavesh M Mehta
*Assistant Examiner*—David P Rashid
(74) *Attorney, Agent, or Firm*—Oliff & Berridge, PLC (57) ABSTRACT

A color image sensor has a first, second, and third color component pixels. The third color component pixel includes more intensity information than the first and second color component pixels. A difference estimating section estimates difference in a signal level exerted on a pixel signal of the third color component pixel, using the pixel signal of a pixel peripheral to the third color component pixel. A correcting section corrects the pixel signal of the third color component pixel on the basis of the estimated difference. Accordingly, when the third color component is green in a Bayer array, a pixel signal of a green pixel in a row of red pixels becomes equal to the pixel signal of a green pixel in a row of blue pixels. Therefore, line crawling can be suppressed without smoothing an image.

18 Claims, 3 Drawing Sheets

U.S. PATENT DOCUMENTS

2003/0030738 A1 2/2003 Clynes et al.
2004/0169746 A1* 9/2004 Chen et al. .................. 348/246

FOREIGN PATENT DOCUMENTS

| JP | A 08-046874 | 2/1996 |
| JP | A-11-177998 | 7/1999 |
| JP | A 2000-285229 | 10/2000 |

* cited by examiner

IMAGING DEVICE PERFORMING COLOR IMAGE DATA PROCESSING

This is a Continuation of application Ser. No. 10/856,842 filed Jun. 1, 2004, the contents of which is hereby incorporated by reference herein in its entirety.

CROSS-REFERENCE TO RELATED APPLICATIONS

This application is based upon and claims the benefit of priority from the prior Japanese Patent Application No. 2003-159459, filed on Jun. 4, 2003, the entire contents of which are incorporated herein by reference.

BACKGROUND OF THE INVENTION

1. Field of the Invention

The present invention relates to an imaging device. To be more specific, the present invention relates to image data processing to be performed on an output signal from a color image sensor in order to obtain a high quality image.

2. Description of the Related Art

When shooting by a video camera or an electronic camera, there are cases where line crawling (line-shaped or grid-like noise) occurs in an image. A cause of the occurrence of the line crawling is fixed pattern noise, such as difference in the sensitivity of each pixel, difference in the output level of each vertical transfer line and the like in a color image sensor. A method for smoothing the image is known as a conventional art for making the line crawling inconspicuous. A low pass filter (hereinafter abbreviated as LPF) and the like are used in this smoothing processing (for example, refer to pages 539-548 of "Image Analysis Handbook" written by Mikio Takagi, supervising editor Haruhisa Shimoda, published by University of Tokyo Press on Jan. 17, 1991).

By the way, in many cases, shot image data is subjected to sharpness enhancing processing such as unsharp masking and the like, in order to increase its sharpness and graininess. This sharpness enhancing processing also emphasizes line crawling, which is supposed to be made inconspicuous. Thus, when the line crawling occurs in original image data, it is necessary that original image data be subjected to the smoothing processing such as LPF before being subjected to the sharpness enhancing processing, in order to reduce the line crawling. It is difficult, however, to effectively subject image data to the sharpness enhancing processing after being smoothed. Therefore, it is difficult to obtain a fine image with sharpness from original image data with the line crawling.

SUMMARY OF THE INVENTION

An object of the present invention is to provide a method for reducing line crawling without image smoothing processing, in an imaging device using a color image sensor.

According to one aspect of the present invention, an imaging device includes a color image sensor, a difference estimating section, and a correcting section, which have the following functions. The color image sensor has a first color component pixel, a second color component pixel, and a third color component pixel. The first to third color component pixels are regularly arranged in a two-dimensional matrix. Each of the first to third color component pixels generates a pixel signal in accordance with the amount of light received. The color image sensor transfers and outputs each of the pixel signals in succession. The third color component pixel includes more intensity information than the first and second color component pixels. The difference estimating section estimates difference in a signal level exerted on the pixel signal of the third color component pixel, with the use of the pixel signal of a pixel peripheral to the third color component pixel. The correcting section corrects the pixel signal of the third color component pixel on the basis of the estimated difference.

"The pixel peripheral to the third color component pixel" that the difference estimating section uses for estimating the difference may be, for example, "at least one of two pixels adjacent to the third color component pixel in a horizontal direction". The horizontal direction designates, for example, the elongation direction of a horizontal CCD.

Otherwise, "the pixel peripheral to the third color component pixel" may be "at least one of two pixels adjacent to the third color component pixel in a vertical direction". The vertical direction designates, for example, the elongation direction of a vertical CCD.

Otherwise, "the pixel peripheral to the third color component pixel" may be "a pixel immediately preceding the third color component pixel in transfer order in the color image sensor".

The foregoing color image sensor refers to, for example, a CCD. The difference estimating section refers to, for example, the calculation function of a striped noise suppressing section for calculating a modified value of a signal level of a pixel signal. The correcting section refers to, for example, the function of the striped noise suppressing section for correcting a signal level of a pixel signal to the modified value.

It is preferable that the imaging device according to this aspect may be as follows. That is, the difference estimating section estimates difference caused by ringing, on the basis of a level of the pixel signal of a pixel, which immediately precedes the third color component pixel in output order of the pixel signal outputted from the color image sensor, or on the basis of variation in levels between the third color component pixel and the immediately preceding pixel thereof.

Otherwise, it is preferable that the imaging device according to this aspect may be as follows. That is, the difference estimating section estimates difference caused by flare on a light-receiving surface of the third color component pixel.

Otherwise, it is preferable that the imaging device according to this aspect may satisfy the following four terms. Firstly, the first color component pixel is a red pixel selectively receiving red light. Secondly, the second color component pixel is a blue pixel selectively receiving blue light. Thirdly, the third color component pixel is a green pixel selectively receiving green light. Fourthly, the difference estimating section estimates the difference on the basis of a level of the pixel signal of the red pixel. Here, the difference is caused by a phenomenon that "red light and infrared light passing through a charge accumulating region in the color image sensor are reflected in a bulk and mixed into a peripheral pixel".

Otherwise, it is preferable that the imaging device according to this aspect is provided with a judging section having the following functions. The judging section judges whether or not a level of the pixel signal is equal to or more than a predetermined value A. The level of the pixel signal is transferred from a pixel, which immediately precedes the third color component pixel in transfer order in the color image sensor. The judging section causes the correcting section to operate only when the judged level is equal to or more than the predetermined value A.

Otherwise, it is preferable that the imaging device according to this aspect is provided with a judging section having the following functions. The judging section compares a level of the pixel signal transferred from a pixel, which immediately precedes the third color component pixel in transfer order in the color image sensor, with a level of the pixel signal of the third color component pixel. The judging section causes the correcting section to operate only when difference in levels of both signals is equal to or more than a predetermined value B.

Otherwise, it is preferable that the imaging device according to this aspect may satisfy the following three terms. Firstly, the imaging device further includes an analog-to-digital conversion section which performs analog-to-digital conversion on the pixel signal outputted from the color image sensor. Secondly, the difference estimating section estimates the difference with the use of the pixel signal after analog-to-digital conversion. Thirdly, the correcting section corrects the pixel signal after analog-to-digital conversion. The analog-to-digital conversion section refers to, for example, the function of an image-data generating section which performs analog-to-digital conversion.

According to another aspect of the present invention, an imaging device includes a color image sensor, a difference estimating section, and a correcting section which have the following functions. The color image sensor has pixels of at least two types of color components, one of which is a first color component pixel. These pixels are regularly arranged in a two-dimensional matrix, and each of the pixels generates a pixel signal in accordance with an amount of light received. The color image sensor transfers and outputs each of the pixel signals in succession. The difference estimating section estimates difference in a signal level exerted on the pixel signal of the first color component pixel, with the use of the pixel signal of the pixel that is adjacent to and different from the first color component pixel. The correcting section corrects the pixel signal of the first color component pixel on the basis of the estimated difference.

BRIEF DESCRIPTION OF THE DRAWINGS

The nature, principle, and utility of the invention will become more apparent from the following detailed description when read in conjunction with the accompanying drawings in which like parts are designated by identical reference numbers, in which.

DESCRIPTION OF THE PREFERRED EMBODIMENT

An embodiment of the present invention will be hereinafter described with reference to the drawings.

Configuration of this Embodiment

Figure 1:
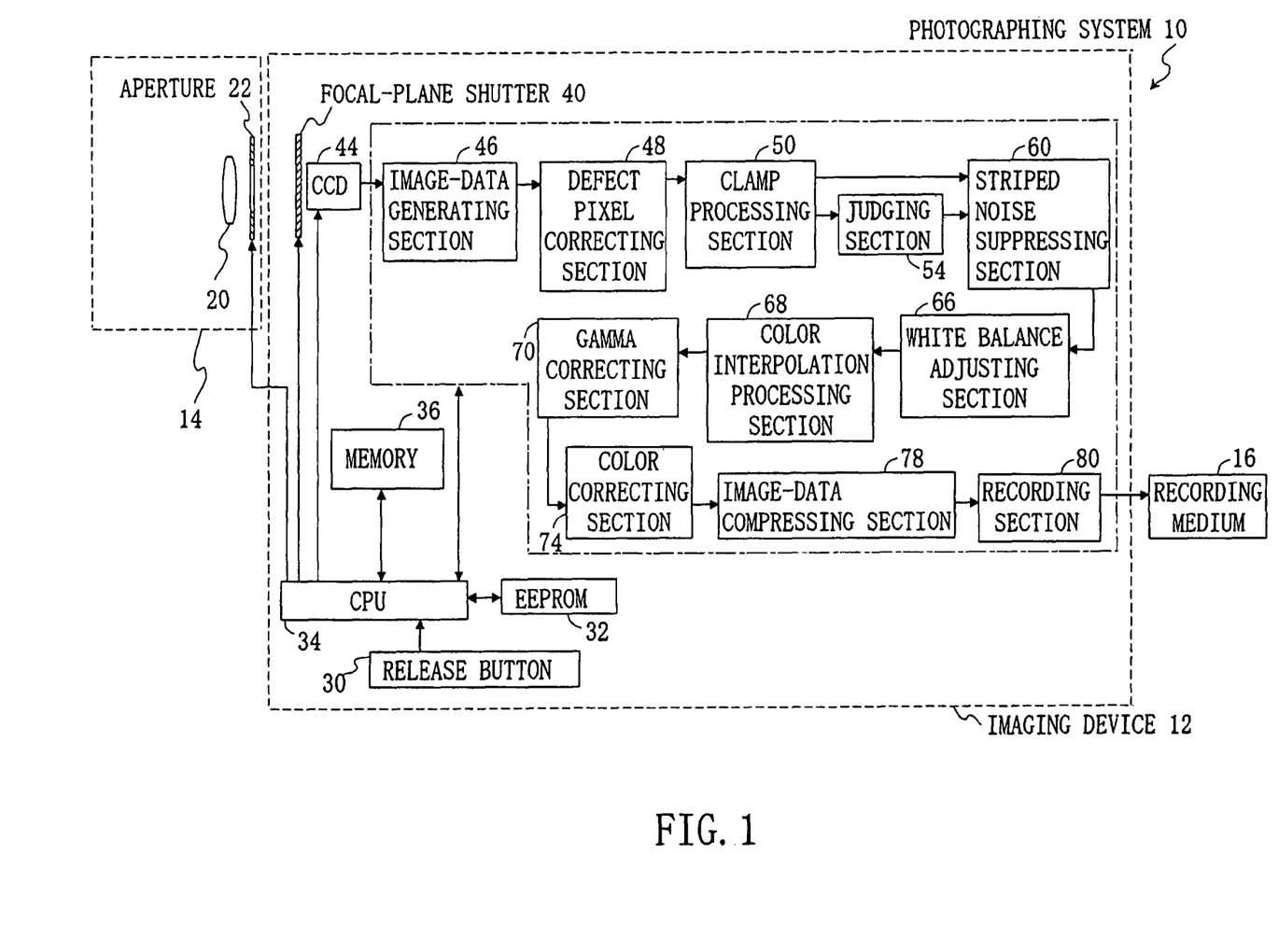
FIG. 1 is a block diagram of a photographing system in which an imaging device according to the present invention is installed.

FIG. 1 shows a block diagram of a photographing system in which an imaging device according to the present invention is installed. Referring to FIG. 1, a photographing system 10 includes an imaging device 12 according to the present invention, a phototaking lens 14 attached to the imaging device 12, and a recording medium 16 connected to the imaging device 12. The phototaking lens 14 includes a lens group 20 and an aperture 22. In this embodiment, by way of example, the imaging device 12 composes an electronic camera.

The imaging device 12 includes a release button 30, an EEPROM 32, a CPU 34, a memory (for example, DRAM) 36, a focal-plane shutter 40, a CCD 44, an image-data generating section 46, a defect pixel correcting section 48, a clamp processing section 50, a judging section 54, a striped noise suppressing section 60, a white balance adjusting section 66, a color interpolation processing section 68, a gamma correcting section 70, a color correcting section 74, an image-data compressing section 78, and a recording section 80.

Upon turning on the release button 30, the release button 30 commands the CPU 34 to start photographing.

The EEPROM 32 stores a parameter which is necessary for controlling the imaging device 12.

The CPU 34 controls a system of the imaging device 12 by use of the EEPROM 32 and the memory 36 (controls a section surrounded by dashed line in FIG. 1).

The memory 36 temporarily stores image data before being converted into a predetermined format and processed.

Figure 2:
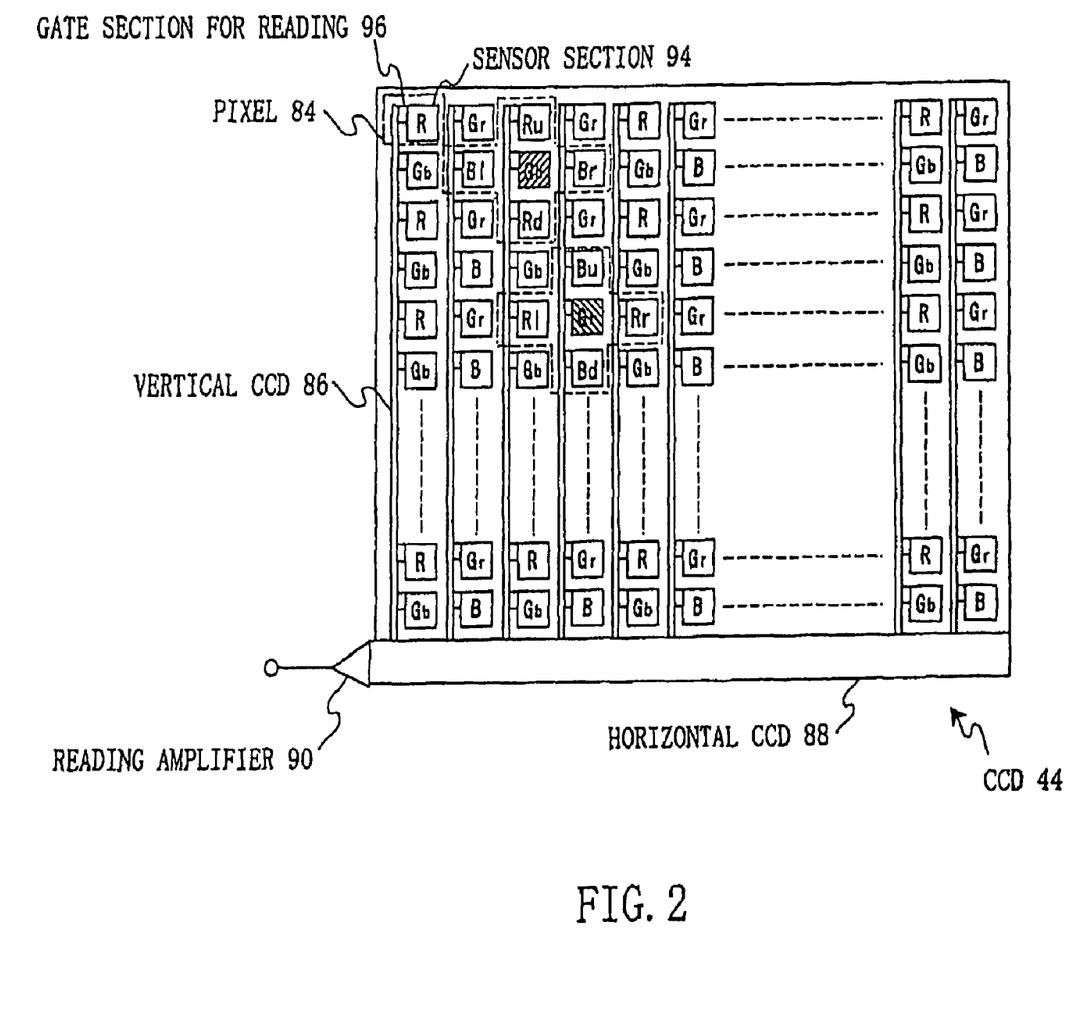
FIG. 2 is a block diagram showing the details of a CCD in FIG. 1.

FIG. 2 is a block diagram showing the details of the CCD 44. The CCD 44 includes many pixels 84 arranged on a not-illustrated semiconductor substrate in the form of a Bayer pattern color filter array, vertical CCDs 86, a horizontal CCD 88, and a reading amplifier 90.

Each pixel 84 includes a part of the vertical CCD 86, a sensor section 94, and a gate section for reading 96. The sensor section 94 is, for example, a buried photodiode which has a P-type surface region on the side of a light-receiving surface and an N-type buried region (charge accumulating region). The sensor section 94 generates and accumulates a pixel signal in accordance with the amount of light received. The pixel signal generated by the sensor section 94 is in a state of signal charge inside the pixel 84.

The side of the light-receiving surface of each pixel 84 is covered with a microlens and an optical filter. The optical filter selectively allows light with a wavelength of any one of red, blue, and green to pass through (not illustrated).

A plurality of vertical CCDs 86 is formed in a direction along the arrangement of the pixels 84. Each of the vertical CCDs 86 is formed per vertical line of the sensor section 94. The signal charge is transferred from the sensor section 94 to each vertical CCD 86 through the gate section for reading 96. The vertical CCDs 86 successively transfer the signal charge to the horizontal CCD 88.

The horizontal CCD 88 successively transfers the signal charge, which is vertically transferred from the vertical CCDs 86 in succession, to the reading amplifier 90 in a horizontal direction.

The reading amplifier 90 amplifies the transferred signal charge with a predetermined gain, to successively input it to the image-data generating section 46.

Explanation for the Operation of this Embodiment

Figure 3:
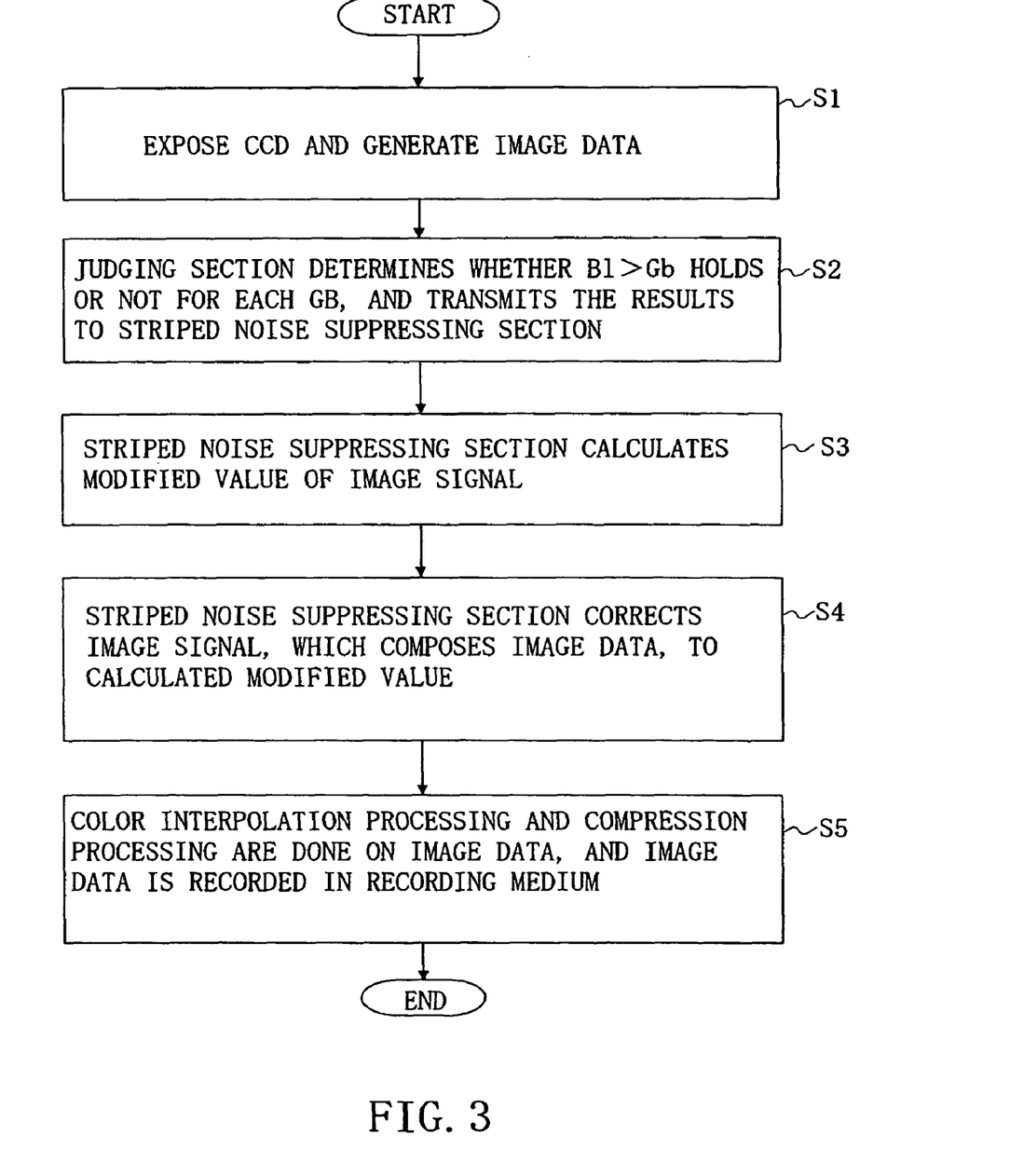
FIG. 3 is a flowchart showing an essential part of signal processing in the imaging device of FIG. 1.

FIG. 3 is a flowchart showing an essential part of signal processing in the foregoing imaging device 12. The signal processing in the imaging device 12 will be hereinafter described by following step numbers shown in FIG. 3.

In the following description, the pixel 84 selectively receiving red light is abbreviated as a red pixel. The pixel 84 selectively receiving blue light is abbreviated as a blue pixel, and the pixel 84 selectively receiving green light is abbreviated as a green pixel. A pixel signal generated by the green pixel in a row of the red pixels is abbreviated as Gr, and a pixel signal generated by the green pixel in a row of the blue pixels is abbreviated as Gb.

Moreover, a pixel signal of the red pixel horizontally adjacent to the pixel corresponding to Gb on the side of the reading amplifier 90 is abbreviated as Bl, and a pixel signal of the red pixel horizontally adjacent thereto on the opposite side of the reading amplifier 90 is abbreviated as Br (refer to Gb in white text on black in FIG. 2). A pixel signal of the blue pixel vertically adjacent to the pixel corresponding to Gb on the side of the horizontal CCD 88 is abbreviated as Rd, and a pixel signal of the blue pixel vertically adjacent thereto on the opposite side of the horizontal CCD 88 is abbreviated as Ru.

[Step S1]

The CCD 44 is exposed in well-known operation. The image-data generating section 46 subjects an analog pixel signal outputted from the CCD 44 to correlated double sampling processing, analog-to-digital conversion, and the like, in order to generate image data. The image data here represents the color of each pixel as the pixel signal of a predetermined bit number. Then, image data is subjected to defect pixel correction and clamp processing, and is inputted to the judging section 54 and the striped noise suppressing section 60.

[Step S2]

The judging section 54 judges whether Bl>Gb is satisfied or not with respect to every Gb. The judging section 54 inputs the judgment result into the striped noise suppressing section 60 as table data.

[Step S3]

The striped noise suppressing section 60 calculates Gb', which is a modified value of Gb, with respect to each Gb. Before the explanation of this calculation, on what base the difference in the pixel signal is estimated will be described cause-by-cause.

Firstly, difference exerted on Gb by a pixel signal of a pixel, which immediately precedes the pixel corresponding to Gb in output order in an output stage (reading amplifier 90) of the CCD 44, is estimated (ringing). The immediately preceding pixel is the blue pixel horizontally adjacent to the pixel of Gb on the side of the reading amplifier 90. When Gb" represents Gb after receiving the difference, and Ka represents a coefficient of the difference, Gb" satisfies the following equation.

$$Gb''=Gb+Bl \times Ka \quad (1)$$

In this embodiment, by way of example, the effect of ringing in the output stage of the CCD 44 is considered only in Gb judged to be Bl>Gb. This is because difference in Gb caused by the ringing is negligible, when Bl is sufficiently smaller than Gb.

Secondly, difference caused by ringing which occurs in a circuit (not illustrated) for carrying out the correlated double sampling processing in the image-data generating section 46 is estimated. The circuit for carrying out the correlated double sampling processing is disposed just behind the CCD 44.

When Gb" represents Gb after receiving the difference, and Kb represents a coefficient of the difference, Gb" satisfies the following equation.

$$Gb''=Gb+Bl \times Kb \quad (2)$$

In this embodiment, however, by way of example, the effect of the ringing in the circuit for carrying out the correlated double sampling processing is considered only in Gb judged to be Bl>Gb, for the same reason as in the case of the equation (1). It is preferable that variation in a reference level in the circuit for carrying out the correlated double sapling processing is also considered by use of this correction coefficient Kb.

Thirdly, difference caused by a pixel signal of a red pixel, which immediately precedes the pixel corresponding to Gb in transfer order during the vertical transfer of the pixel signal in the CCD 44, is estimated. When Gb" represents Gb after receiving the difference, and Kc represents a coefficient of the difference, Gb" satisfies the following equation.

$$Gb''=Gb+Rd \times Kc \quad (3)$$

Fourthly, difference caused by flare (the leak of light) on the light-receiving surface of the green pixel is estimated. To be more specific, the difference means difference in a case where light obliquely incident on the microlenses over the light-receiving surfaces of the red pixel and the blue pixel, both of which are adjacent to the green pixel corresponding to Gb, is mixed into the sensor section 94 of the green pixel. When Gb" represents Gb after receiving the difference, and Kd and Ke represent coefficients of the difference, Gb" satisfies the following equation.

$$Gb''=Gb+\{(Bl+Br)/2\} \times Kd+\{(Ru+Rd)/2\} \times Ke \quad (4)$$

In the above equation, both of coefficients Kd and Ke are positive. Generally, the single pixel 84 including a part of the vertical CCD 86, the gate section for reading 96, and the sensor section 94, is formed in the shape of an approximately square. In other words, the sensor section 94 is longer in the vertical direction. Therefore, the vertically adjacent red pixel has the larger effect of flare on the green pixel, than the horizontally adjacent blue pixel. Thus, Ke is larger than Kd.

Fifthly, difference caused by a phenomenon that red light and infrared light which pass through the charge accumulating region in the red pixel are reflected in a bulk, and mixed into the green pixel corresponding to Gb is estimated. When Gb" represents Gb after receiving the difference, and Kf represents a coefficient of the difference, Gb" satisfies the following equation.

$$Gb''=Gb+\{(Ru+Rd)/2\} \times Kf \quad (5)$$

The coefficient Kf is positive in the above equation. In most cases, the difference caused by the fifth reason is little in a CCD-type image sensor, and is large in a CMOS-type image sensor.

On the basis of the foregoing five reasons, the striped noise suppressing section 60 calculates the modified value Gb' of each Gb judged to be Bl>Gb, by use of the following equation (6). Since Gb in the equation (6) is assumed to be affected by the foregoing five reasons, Gb corresponds to Gb" in the equations (1) to (5). Therefore, Gb is corrected to the modified value Gb', by contrarily subtracting terms of the correction coefficients added in the equations (1) to (5).

$$Gb' = Gb - Bl \times (Ka+Kb) - Rd \times Kc - \{(Bl+Br)/2\} \times Kd - \{(Ru+Rd)/2\} \times (Ke+Kf) \quad (6)$$

In a like manner, the striped noise suppressing section 60 calculates a modified value Gb' of each Gb which is not judged to be Bl>Gb, by use of the following equation.

$$Gb' = Gb - Rd \times Kc - \{(Bl+Br)/2\} \times Kd - \{(Ru+Rd)/2\} \times (Ke+Kf) \quad (7)$$

In the equation (7), a correction term for ringing in the equation (6) is eliminated due to the foregoing reason.

The striped noise suppressing section 60 also calculates a modified value R' of a pixel signal R of the red pixel with the use of the following equation. R includes both of Ru and Rd without distinction.

$$R'=R \times \{1+(Ke/2)+(Kf/2)\} \quad (8)$$

Furthermore, the striped noise suppressing section 60 calculates a modified value B' of a pixel signal B of the blue pixel with the use of the following equation. B includes both of Bl and Br without distinction.

$$B' = B \times (1 + Kd/2) \tag{9}$$

[Step S4]

The striped noise suppressing section 60 corrects every signal level of Gb, R, and B to the modified values Gb', R', and B' calculated by the equations (6) to (9).

In this embodiment, Gr is not corrected due to the following reason.

Since the sensor section 94 is longer in the vertical direction, Gb and Gr tend to be affected by the vertically adjacent pixels rather than the horizontally adjacent pixels, except the ringing in the output stage of the CCD 44 and a correlated double sampling circuit. The intensity of red color is higher than that of blue color. Thus, in general, when a subject with even color is photographed, Gb outputted from the pixel vertically adjacent to the red pixel tends to be larger than Gr. Therefore, when Gb is corrected to be smaller without making a correction to Gr, Gr and Gb when shooting the subject with even color become equal to each other.

[Step S5]

Thereafter, image data is subjected to white balance adjustment, color interpolation processing, gamma correction, color correction processing (for example, edge enhancing processing), and image compression (for example, JPEG conversion). Then, the recording section 80 records compressed image data on the recording medium 16.

That is the explanation of the operation of the imaging device 12 according to this embodiment.

How to calculate the foregoing coefficients Ka to Kf will be hereinafter supplemented.

The coefficients Ka to Kf may be obtained by test photography using the imaging device 12, for example, during manufacturing or before shipment. After photographing a test chart the whole surface of which is evenly red, a test chart the whole surface of which is evenly blue, and the like, for example, obtained image data is analyzed to calculate the coefficients Ka to Kf. Then, obtained coefficients are rewritably stored in the EEPROM 32.

Taking a case that striped noise appears only in the vertical direction in image data which is obtained by photographing the foregoing test charts, for example, the foregoing coefficients Ka, Kb, and Kd may be made zero, and only vertical correction may be carried out. Otherwise, when striped noise appears only in the horizontal direction, the foregoing coefficients Kc and Ke may be made zero, and only horizontal correction may be carried out.

The coefficients Ka to Kf may be calculated one-by-one on a cause basis. For example, ringing which occurs by inputting a predetermined pulse wave into the reading amplifier 90 may be measured to obtain Ka. Otherwise, photographing a test chart in which only a single pixel is black point and the other whole pixels are illuminated by red light, signal levels outputted from the black point and peripheral pixels thereof may be measured to obtain Ke (in the case of CCD-type image sensor and Kf≈0).

Effect of this Embodiment

In this embodiment, the modified value of Gb is calculated in consideration of the foregoing reasons of the difference, on the basis of the pixel signals of four pixels with different colors which are vertically and horizontally adjacent to the green pixel corresponding to Gb (step S3). Then, Gb, which tends to be larger than Gr in general, is corrected to be smaller by use of the obtained modified value (step S4). Therefore, when a subject with even color is photographed, Gb is so corrected as to be equal to Gr. In other words, it is possible to suppress line crawling without smoothing an image.

Accordingly, when photographed image data is subjected to processing for suppressing striped noise according to this embodiment, image data after the processing is not smoothed. Thus, it is possible to effectively subject image data to edge enhancing processing. As a result, it is possible to obtain a fine image with sharpness.

In the step S2, the judging section 54 judges whether Bl>Gb is satisfied or not with respect to every Gb, and inputs the judgment result into the striped noise suppressing section 60 as table data. The difference by the ringing is corrected in only Gb which is judged to be Bl>Gb, on the basis that the smaller Bl is, the smaller the difference of Gb caused by the ringing will be (equation (6)). Therefore, it is possible to effectively correct the difference of Gb caused by the ringing.

The pixel signals of the red pixel and the blue pixel are also corrected with the use of the coefficients Kd and Ke for correcting the difference of Gb caused by flare (equations (8) and (9)). This processing means that light, which is obliquely incident on the microlenses over the surfaces of the red pixel and the blue pixel and is mixed into the adjacent green pixel as noise, is returned to the pixel signals of the red and blue pixels. Therefore, it is possible to increase the reproducibility of the color of a photographed subject.

In the case of the CMOS-type image sensor, in a like manner, the pixel signal of the red pixel is also corrected with the use of the coefficient Kf, which corrects the difference caused by the red light and infrared light reflected in the bulk (equation (9)). This processing means that light, which passes through the charge accumulating region of the red pixel and is mixed into the peripheral pixels as noise, is returned to the pixel signal of the red pixel. Therefore, it is possible to increase the reproducibility of the color of a photographed subject.

Furthermore, the coefficients Ka to Kf are rewritably stored in the EEPROM 32. Therefore, it is possible to repeatedly calculate and store the foregoing coefficients Ka to Kf, thereby increasing the user-friendliness. This is because it is assumed that, for example, a user who has used the imaging device 12 for the long term requests readjustment of a service center.

Supplements of this Embodiment

[1] In this embodiment, the color image sensor is the Bayer pattern color filter array. The present invention, however, is not limited to such an embodiment. The color image sensor may be, for example, a honeycomb array, a complementary color array, and the like. In the case of a CCD-type image sensor with the honeycomb array, a horizontal direction described in claims corresponds to, for example, a direction clockwise or counterclockwise inclined approximately 45 degrees with respect to the elongation direction of a horizontal transfer section in a light-receiving surface. The vertical direction is a direction orthogonal to the horizontal direction in the light receiving surface.

[2] In this embodiment, the imaging device 12 composes the electronic camera. The present invention, however, is not limited to such an embodiment. The method for suppressing striped noise according to the present invention is also applicable to an imaging device of a scanner and the like.

[3] In this embodiment, whether or not Bl>Gb is satisfied is judged in step S2, and the difference caused by the ringing is corrected in only Gb satisfying the equation, by use of a term of the coefficient Ka. The present invention, however, is not limited to such an embodiment.

When it is known that the main cause of the difference is the ringing in the output stage of the CCD 44, for example, calculation processing may be simplified in any of the following two ways.

Firstly, only when Bl outputted from a pixel, which immediately precedes the pixel corresponding to Gb in transfer order in the output stage of the CCD 44, is equal to or more than a predetermined value (corresponding to a predetermined value A described in claims), the difference of Gb is corrected by use of the term of the coefficient Ka.

Secondly, only when a value obtained by dividing Bl from an adjacent pixel by Gb is equal to or more than a predetermined value (corresponding to a predetermined value B described in claims), the difference of Gb is corrected by use of the term of the coefficient Ka. "Difference in levels of both signals" described in claims corresponds to, for example, the ratio of signal levels of the foregoing both signals.

[4] In this embodiment, Gb is corrected with the use of the pixel signals of the four pixels with different colors, which are adjacent to the green pixel corresponding to Gb in the horizontal and vertical directions. The present invention, however, is not limited to such an embodiment.

For example, Gb may be corrected with the use of only one or both of the pixel signals from the two blue pixels horizontally adjacent to the green pixel corresponding to Gb. When Gb is corrected with the use of only pixels adjacent in the horizontal direction, in this manner, necessary line memory can be reduced to one-third, as compared with the case of correction by use of the vertically adjacent two pixels.

Otherwise, Gb may be corrected by use of only one or both of the pixel signals from the two red pixels, which are vertically adjacent to the green pixel corresponding to Gb.

Otherwise, Gb may be corrected by use of only Bl outputted from the blue pixel, which is horizontally adjacent to the green pixel corresponding to Gb on the side of the reading amplifier 90. Here, Bl used in the correction is a pixel signal immediately preceding Gb in transfer order during horizontal transfer in the CCD 44. Also in this case, necessary line memory can be reduced to one-third, as compared with the case of correction by use of the vertically adjacent two pixels.

Otherwise, Gb may be corrected by use of only Rd outputted from the red pixel, which is vertically adjacent to the green pixel corresponding to Gb on the side of the horizontal CCD 88. Rd used in the correction is a pixel signal immediately preceding Gb in transfer order during vertical transfer in the CCD 44.

[5] In this embodiment, Gr and Gb when shooting a subject with even color become equal to each other, by correcting Gb without correcting Gr. The present invention, however, is not limited to such an embodiment. For example, both of Gb and Gr may be corrected by the following procedure.

As is the case with Gb, Gr' represents a modified value of Gr, and Rl and Rr represent pixel signals from red pixels which are horizontally adjacent to a pixel corresponding to Gr, respectively (refer to Gr in white text on black in FIG. 2). Gb' and Gr' are calculated by the following equations.

$$Gb' = Gb + \{(Bl+Br)/2\} \times Km \quad (10)$$

$$Gr' = Gr + \{(Rl+Rr)/2\} \times Kn \quad (11)$$

In the above equations, both coefficients Km and Kn, which are positive, are obtained by the above-mentioned test photography and the like. As described above, since Gb tends to become larger than Gr, Km and Kn satisfy an equation of Km>Kn. Km has been taken into account the difference caused by the ringing of Bl, flare on a light-receiving surface, and the like. Kn has been taken into account the difference caused by the ringing of Rl, flare on the light-receiving surface, the mixture of red light and infrared light reflected in the bulk, and the like. Also in this case, necessary line memory can be reduced to one-third, as compared with the case of correction by use of the vertically adjacent two pixels.

[6] In this embodiment, as shown in the equations (1) and (2), the difference caused by the ringing is corrected on the basis of the signal level of the immediately preceding pixel in transfer order. The present invention, however, is not limited to such an embodiment.

The difference caused by the ringing may be corrected on the basis of the difference between the signal level of Gb and the signal level of the pixel immediately preceding Gb in transfer order. In this case, the foregoing equation (6) is changed to the following equation (12).

$$Gb' = Gb - (Bl - Gb) \times (Ka' + Kb') - Rd \times Kc - \{(Bl + Br)/2\} \times Kd - \{(Ru + Rd)/2\} \times (Ke + Kf) \quad (12)$$

In the equation (12), Ka' represents a correction coefficient which corresponds to Ka described above, and Kb' represents a correction coefficient which corresponds to Kb described above.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. An imaging device comprising:
   a color image sensor having a first color component pixel, a second color component pixel, and a third color component pixel including more intensity concerning luminance information than said first color component pixel and said second color component pixel, said first to third color component pixels being regularly arranged in a two-dimensional matrix, each of said first to third color component pixels generating a pixel signal in accordance with an amount of light received, and said color image sensor transferring and outputting said each pixel signal in succession;
   a difference estimating section estimating difference in a signal level exerted on said pixel signal of said third color component pixel, with the use of said pixel signal of a pixel peripheral to said third color component pixel;
   a correcting section correcting said pixel signal of said third color component pixel using said pixel signal of said third color component pixel and a coefficient provided on the basis of the estimated difference; and
   a judging section judging whether or not a level of said pixel signal is equal to or more than a predetermined value A, the level of said pixel signal being transferred from a pixel immediately preceding said third color component pixel in transfer order in said color image sensor, and said judging section causing said correcting section to operate only when the judged level is equal to or more than said predetermined value A.

2. The imaging device according to claim 1, wherein
said difference estimating section estimates said difference that occurs on said third color component caused by ringing.

3. The imaging device according to claim 1, wherein
said difference estimating section estimates said difference caused by flare on a light-receiving surface of said third color component pixel.

4. The imaging device according to claim 1, wherein:
said first color component pixel is a red pixel selectively receiving red light;
said second color component pixel is a blue pixel selectively receiving blue light;
said third color component pixel is a green pixel selectively receiving green light; and
said difference estimating section estimates said difference on the basis of a level of said pixel signal of said red pixel, said difference being caused by a phenomenon that red light and infrared light passing through a charge accumulating region in said color image sensor are reflected in a bulk and mixed into a peripheral pixel.

5. The imaging device according to claim 1, wherein
said pixel peripheral to said third color component pixel is at least one of two pixels adjacent to said third color component pixel in a horizontal direction.

6. The imaging device according to claim 1, wherein
said pixel peripheral to said third color component pixel is at least one of two pixels adjacent to said third color component pixel in a vertical direction.

7. The imaging device according to claim 1, wherein
said pixel peripheral to said third color component pixel is a pixel immediately preceding said third color component pixel in transfer order in said color image sensor.

8. The imaging device according to claim 1, further comprising
an analog-to-digital conversion section performing analog-to-digital conversion on said pixel signal outputted from said color image sensor, wherein:
said difference estimating section estimates said difference with the use of said pixel signal after analog-to-digital conversion; and
said correcting section corrects said pixel signal after analog-to-digital conversion.

9. An imaging device comprising:
a color image sensor having a first color component pixel, a second color component pixel, and a third color component pixel including more intensity concerning luminance information than said first color component pixel and said second color component pixel, said first to third color component pixels being regularly arranged in a two-dimensional matrix, each of said first to third color component pixels generating a pixel signal in accordance with an amount of light received, and said color image sensor transferring and outputting said each pixel signal in succession;
a difference estimating section estimating difference in a signal level exerted on said pixel signal of said third color component pixel, with the use of said pixel signal of a pixel peripheral to said third color component pixel;
a correcting section correcting said pixel signal of said third color component pixel using said pixel signal of said third color component pixel and a coefficient provided on the basis of the estimated difference; and
a judging section comparing a level of said pixel signal transferred from a pixel immediately preceding said third color component pixel in transfer order in said color image sensor, with a level of said pixel signal of said third color component pixel, and said judging section causing said correcting section to operate only when difference in levels of both signals is equal to or more than a predetermined value B.

10. The imaging device according to claim 9, wherein
said difference estimating section estimates said difference that occurs on said third color component caused by ringing.

11. The imaging device according to claim 9, wherein
said difference estimating section estimates said difference caused by flare on a light-receiving surface of said third color component pixel.

12. The imaging device according to claim 9, wherein:
said first color component pixel is a red pixel selectively receiving red light;
said second color component pixel is a blue pixel selectively receiving blue light;
said third color component pixel is a green pixel selectively receiving green light; and
said difference estimating section estimates said difference on the basis of a level of said pixel signal of said red pixel, said difference being caused by a phenomenon that red light and infrared light passing through a charge accumulating region in said color image sensor are reflected in a bulk and mixed into a peripheral pixel.

13. The imaging device according to claim 9, wherein
said pixel peripheral to said third color component pixel is at least one of two pixels adjacent to said third color component pixel in a horizontal direction.

14. The imaging device according to claim 9, wherein
said pixel peripheral to said third color component pixel is at least one of two pixels adjacent to said third color component pixel in a vertical direction.

15. The imaging device according to claim 9, wherein
said pixel peripheral to said third color component pixel is a pixel immediately preceding said third color component pixel in transfer order in said color image sensor.

16. The imaging device according to claim 9, further comprising
an analog-to-digital conversion section performing analog-to-digital conversion on said pixel signal outputted from said color image sensor, wherein:
said difference estimating section estimates said difference with the use of said pixel signal after analog-to-digital conversion; and
said correcting section corrects said pixel signal after analog-to-digital conversion.

17. An imaging device comprising:
a color image sensor having pixels of at least two types of color components, one of which is a first color component pixel, said pixels being regularly arranged in a two-dimensional matrix, each of said pixels generating a pixel signal in accordance with an amount of light received, and said color image sensor transferring and outputting said each pixel signal in succession;
a difference estimating section estimating difference in a signal level exerted on said pixel signal of said first color component pixel, with the use of said pixel signal of the pixel that is adjacent to and different from said first color component pixel;
a correcting section correcting said pixel signal of said first color component pixel using said pixel signal of said first color component pixel and a coefficient provided on the basis of the estimated difference; and
a judging section judging whether or not a level of said pixel signal is equal to or more than a predetermined value A, the level of said pixel signal being transferred from a pixel immediately preceding said first color component pixel in transfer order in said color image sensor, and said judging section causing said correcting section to operate only when the judged level is equal to or more than said predetermined value A.

18. An imaging device comprising:

a color image sensor having pixels of at least two types of color components, one of which is a first color component pixel, said pixels being regularly arranged in a two-dimensional matrix, each of said pixels generating a pixel signal in accordance with an amount of light received, and said color image sensor transferring and outputting said each pixel signal in succession;

a difference estimating section estimating difference in a signal level exerted on said pixel signal of said first color component pixel, with the use of said pixel signal of the pixel that is adjacent to and different from said first color component pixel;

a correcting section correcting said pixel signal of said first color component pixel using said pixel signal of said first color component pixel and a coefficient provided on the basis of the estimated difference; and a judging section comparing a level of said pixel signal transferred from a pixel immediately preceding said first color component pixel in transfer order in said color image sensor, with a level of said pixel signal of said first color component pixel, and said judging section causing said correcting section to operate only when difference in levels of both signals is equal to or more than a predetermined value B.

* * * * *